United States Patent [19]

Renshaw et al.

[11] Patent Number: 4,496,095
[45] Date of Patent: Jan. 29, 1985

[54] PROGRESSIVE ULTRASONIC WELDING SYSTEM

[75] Inventors: Theodore A. Renshaw, North Babylon; Albert Sarrantonio, Woodbury, both of N.Y.

[73] Assignee: Fairchild Industries, Inc., Germantown, Md.

[21] Appl. No.: 484,244

[22] Filed: Apr. 12, 1983

[51] Int. Cl.$^3$ .............................................. B23K 20/10
[52] U.S. Cl. .................................. 228/102; 228/1 R; 228/1 B; 228/111
[58] Field of Search .................. 228/102, 7, 1 R, 1 B, 228/110, 111

[56] References Cited

U.S. PATENT DOCUMENTS

| | | | |
|---|---|---|---|
| 3,533,155 | 10/1970 | Coucoulas | 228/110 X |
| 3,548,921 | 11/1970 | Christensen | 228/102 |
| 3,610,506 | 10/1971 | Robinson | 228/111 |
| 3,623,214 | 11/1971 | Sciaky et al. | 228/102 |
| 3,822,465 | 7/1974 | Frankort et al. | 228/1 R X |
| 4,047,657 | 9/1977 | Mims | 228/110 X |
| 4,067,490 | 1/1978 | Jones et al. | 228/102 |

Primary Examiner—Kenneth J. Ramsey
Attorney, Agent, or Firm—Michael W. York

[57] ABSTRACT

A method of progressively ultrasonically welding together workpieces is provided wherein the spot welds effected are initiated as small points and then progressively grow to full size. The method employs an ultrasonic welding apparatus of the type having a welding tip and a complimentary anvil between which the workpieces to be welded may be inserted. The workpieces are first clamped together and the workpieces "pre-squeezed" to disperse any adhesives which may be used between the workpieces. Initial pressure and energy levels are then introduced to "scrub" the workpieces. Pressure and energy are then synchronously ramped in phase to maximum levels to effect a weld between the workpieces. The welding operation is controlled by control means which permit automatic synchronization of the operation.

19 Claims, 6 Drawing Figures

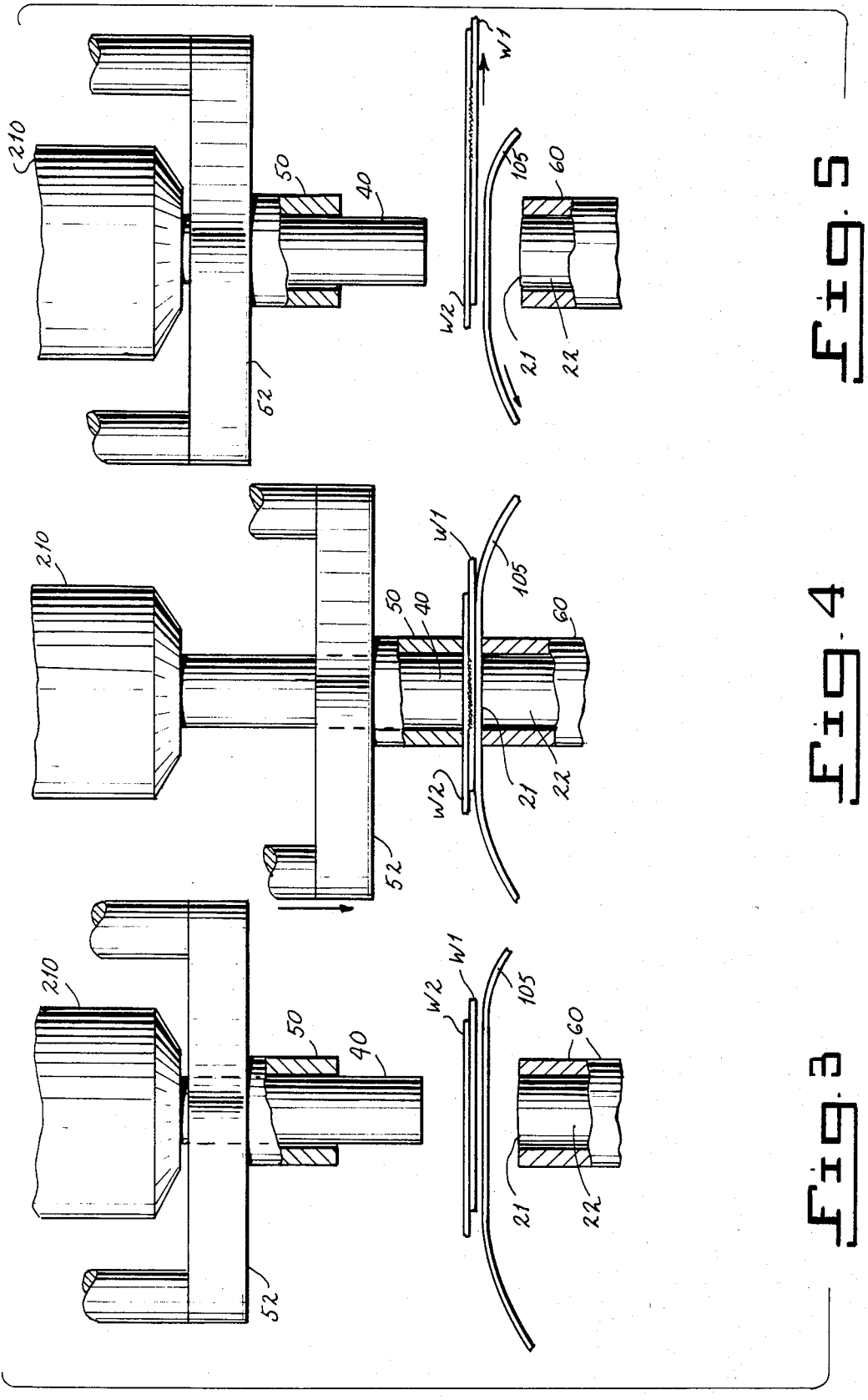

PROGRESSIVE ULTRASONIC WELDING SYSTEM

BACKGROUND OF THE INVENTION

The present invention relates generally to a progressive ultrasonic spot welding system and, more particularly, to such a system wherein forging pressure and ultrasonic welding power levels are closely monitored and coordinated during the welding cycle so that the weld spot is started as a small point in comparison to its final size and is then progressively expanded to full size. Forging pressure and welding power are synchronously ramped and increased in conjunction with one another. The system further provides for an automatic sequential operation of a series of welding functions which, heretofore, had existed as independent manual operations thus providing a faster and more repeatable weld procedure with reduced operator burden. The system achieves positive pressure and power control by providing a single synchronization signal that programs pressure and power application for the weld cycle.

Ultrasonic vibratory spot welding processes for joining together two or more similar or dissimilar materials have been used for a number of years. Until recently, however, such methods were limited to use on thermoplastics, non-woven fabrics and metals where weld strength and integrity were not particularly important. This limitation was due, in large measure, to the problems associated with the ultrasonic welding methods employed, most of which were in prototype stages. In those instances when weld strength and weld integrity were important, i.e., when joining together structural aircraft panels and the like, resistance spot welding techniques were used.

Ultrasonic spot welding procedures have recently demonstrated strong potential for improved sheet metal assembly at reduced cost when compared with resistance spot welding and adhesive bonding techniques. Early studies have indicated that welds effected using prototype ultrasonic welding equipment such as, for example, a Sonobond M-8000 ultrasonic spot welder, were superior to welds produced using conventional resistance spot welding procedures. These early trials indicated that for virtually any material combination, an ultrasonically produced spot weld has an ultimate yield strength of more than 2.5 times that of a weld produced using resistance spot welding equipment. Further tests have indicated that ultrasonically produced spot welding can be accomplished with a 75% time and cost savings over conventional adhesive bonding techniques. Until now, however, ultrasonic spot welding for large structural metal parts was not possible in a production environment because of the numerous problems associated with the procedures.

Ultrasonic vibratory welding is a metallurgical joining technique which utilizes high frequency vibrations to disrupt the surface films and oxides and which, therefore, promotes interatomic diffusion and plastic flow between the surfaces in contact without any melting of the materials. Briefly stated, the ultrasonic welding process consists of clamping or otherwise securing together the workpieces under moderate pressure between the welding tip and a support anvil and then introducing high frequency vibratory energy into the pieces for a relatively short period of time, i.e., from a fraction of a second to a number of seconds. In many instances, the pieces to be welded are also adhesively bonded together by the insertion of an adhesive bonding agent between the juxtaposed pieces before welding which results in a high strength joint with superior static and fatigue properties.

One example of an ultrasonic spot welder particularly adapted for use on structural metal workpieces is the Sonobond Model M-8000 ultrasonic spot welder marketed by Sonobond Corporation of West Chester, PA. This welder includes a transistorized, solid state frequency converter which raises standard 60 Hz electrical line frequency to 15-40 kHz and then amplifies the output. The high frequency electrical power travels through a lightweight cable to a transducer in the welding head where it is converted to vibratory power at the same frequency. The vibratory power is, thereupon, transmitted through an acoustic coupling system to the welding tip and then through the tip into and through the workpieces, with the vibratory energy effecting the weld.

The Sonobond M-8000 ultrasonic spot welder includes a wedge-reed transducer coupling system which transmits lateral vibrations of a perpendicular reed member attached to it so that the welding tip at the lower end of the reed executes shear vibrations on the surface of the workpieces. The transducer includes piezoelectric ceramic elements encased in a tension shell assembly and operates at a nominal frequency of 15 kHz. A solid state frequency converter with a transistorized hybrid junction amplifier powers the welder. The converter operates at a nominal frequency of 15 kHz with a power output variable up to about 4000 RMS RF watts. The welder may be tuned to a precise operating frequency. The frequency converter includes a wide-band RF power measuring circuit which samples output power and detects forward power and load power based on the principle of bi-directional coupling in a transmission line. The signal is processed electronically to provide true RMS values which are selectively displayed on a light emitting diode (LED) panel meter as either the forward or load power. Forward power is the output of the frequency converter delivered to the transducer in the welding head while load power is the transducer drive power acoustically absorbed by the anvil. The difference between the two readings is the reflected power induced by the load impedance mismatch and is minimized during the welding operation by impedance matching techniques.

It has been found that by coordinating forging pressure and ultrasonic welding power levels so as to begin the weld as a very small point in comparison to its eventual final size and then syncronously ramping the pressure and welding power in order to progressively expand the weld outwardly to full size, any problems heretofore experienced with slippage of the welding tip relative to the workpiece have been substantially reduced. The act of welding produces a "thermal mound" on the workpieces between the welding tip and the anvil. The thermal mound is a geometrically unstable condition since it tends to cause the tip or the anvil to "walk away" from the workpieces or it causes the workpieces to be driven away from the welding area. Either of these actions diffuses the welding power and prevents optimal application of the weld spot. It is therefore an advantage of the progressive growth practice that the tip and/or anvil have an opportunity at low power stages to create a forged indentation on the thermal mound which is more appropriate to the power level and therefore lessens the inclination of the tip or anvil to walk away or eject the workpiece.

More importantly, the welds produced using such progressive weld growth procedures have proven to be structurally superior to welds produced when the welding power and pressure are stepped or otherwise abruptly increased. Shearing and welding actions occur in the annulus surrounding either a central friction locked area or a previously welded central area. A spot weld can best be made to grow coherently if the contact area is progressively enlarged by increasing contact pressure and welding power of the transverse strokes.

Efforts to progressively expand spot welds have been attempted in the past. For example, U.S. Pat. No. 3,610,506 which issued to Peter T. Robinson on Oct. 5, 1971, describes a method for ultrasonically welding using a varying welding pressure. A welding cycle is used by Robinson in which the vibratory energy is applied at the time the welding pressure is diminished although during the period in which vibratory energy is applied, the average value of the welding pressure with time continues to rise until termination of the welding cycle at which time a peak value is reached. At the conclusion of the welding cycle, the welding pressure drops to zero. The procedure followed by Robinson, which is intended for use in the semi-conductor industry where welding is effected at relatively low power levels in comparison to the power levels used in welding structural metal parts, allows the welding pressure to rise in a natural manner inherent to the pressure producing apparatus when contact is made to the workpiece and then full welding power is sharply applied. There is no coordination of the pressure and welding power or gradual ramping of both to effect a progressive gradual increase in weld size.

It has been found that by coordinating forging pressure and ultrasonic welding power, one is able to obtain superior results to those achieved by the method taught in the Robinson patent in that the welds produced thereby have proven to be structurally superior. In accordance with the welding practices discovered herein, the ultrasonic spot welds are started at low contact pressure and at low power levels which are then simultaneously increased resulting in an increase in weld size. The pressure and power are increased to a maximum. Welding power should always be insufficient to decouple the welding tip but sufficient to apply shear forces at the edge of any prevailing contact area. The present method has a sound phenomenological basis for controlled application with a variety of metals, thicknesses and contamination levels. The improved properties of the weld and reduced pre-cleaning costs give it strong potential for replacing resistance spot welding procedures. Further, it has been found that the method results in increased machine reliability. Abrupt power increases and decreases, heretofore commonplace in welding operations, tend to cause oscillatory motion or "ringing" which can be eliminated by more gradual increases and decreases in welding power applications. Step functions apply mechanical stresses to wire wound power resistors which have caused them to crack and fail. Step functions also lead to too vigorous actions at the beginning of the welds with the chance that decoupling can occur and large voltage spikes can be created in the piezo electric crystals which then pass into the power supplies and can cause transistor and fuse failures. Such chances of failure are virtually eliminated using progressive growth techniques.

Moreover, control systems heretofore used in prototype ultrasonic welding apparatus constitute little more than a collection of add-on circuits which include external power supplies. Typically, such systems failed to include a single source of synchronization signals which permit coordinated programming of pressure and power applications for the weld cycle. Such systems also experienced great difficulty in exactly repeating welding cycles. It is, of course, highly desirable to provide a single linear ramp signal which triggers both the power and pressure application simultaneously and which can concurrently control same. The system of the subject invention addresses the automation of the following functions of the welding cycle of the welding operation: initiation of the welding procedure with the movement of the anvil to engage the workpieces and the welding tip; application of a timed high pressure pulse between the anvil, the workpieces and the welding tip; return of the high pressure to a low pressure for the start of the weld; movement of the clamping system so as to close on the workpieces and press it against the clamping system; itiation of the power phase of the weld cycle after clamping pressure is attained; phase synchronous rise of both the anvil pressure and ultrasonic welding power; termination of the weld cycle; release of the clamping pressure and the release of the clamping system; release of the anvil pressure and return of the anvil to a predetermined level; and activation of the transport system to move sacrificial metal tape used for preventing or minimizing tip sticking over the welding tip a predetermined amount.

Commercially available welding machines fail to include such automatic sequencing systems. Available commercial welders generally have built into them little more than a weld operation initiation switch for closing the anvil upon the workpiece and welding tip. Upon contact of the anvil/workpiece/welding tip combination, a pressure switch is generally closed and preselected ultrasonic power and pressure levels are applied in a step function at a constant level for the time period of the weld. The constant power and pressure persist through a timed period. At the conclusion of the timed period, a switch opens and the ultrasonic welding power is removed. Simultaneously, the anvil is raised removing the clamping pressure from the workpiece. The workpiece is thereupon released permitting movement for the next welding cycle. As will be appreciated, such attempts are extremely basic and fail to offer the specific advantages contemplated by the present system.

Against the foregoing background, it is a primary object of the present invention to provide a progressive ultrasonic welding system.

It is another object of the present invention to provide such a system wherein the ultrasonic spot weld is initiated as a small point in comparison to the final size and then progressively expanded to full size.

It is yet another object of the present invention to provide such a system wherein the spot is started under low contact pressure and low power.

It is still another object of the present invention to provide such a system wherein the pressure and welding power are coherently and synchronously ramped to a predetermined maximum pressure and power to thereby progressively expand the weld to full size.

It is still yet another object of the present invention to provide such a system wherein the welding power applied is insufficient to decouple the welding tip but sufficient to apply shear forces at the edges of the prevailing contact area.

It is yet still another object of the present invention to provide such a system wherein the application of power and pressure is coordinated by the application of a linear ramp signal which triggers both power and pressure application.

SUMMARY OF THE INVENTION

The present invention, in brief summary, comprises a method of progressively ultrasonically welding together workpieces wherein the spot welds effected are initiated as small points and then progressively grown to full size. The method employs an ultrasonic welding apparatus of the type having a welding tip and a complimentary anvil between which the workpieces to be welded may be inserted. The workpieces are first clamped together and the workpieces "presqueezed" to disperse any adhesives which may be used between the workpieces. Initial pressure and energy levels are then introduced to "scrub" the workpieces. Pressure and energy are then synchronously ramped in phase to maximum levels to effect a weld between the workpieces. The welding operation is controlled by control means which permit automatic synchronization of the operation.

BRIEF DESCRIPTION OF THE DRAWINGS

The foregoing and still other objects and advantages of the present invention will be more apparent from the detailed explanation of the preferred embodiment of the invention in connection with the accompanying drawings wherein:

FIGS. 3-5 illustrate the weld zone during the sequential welding operation of the present invention.

DETAILED DESCRIPTION OF THE INVENTION

Figure 1:
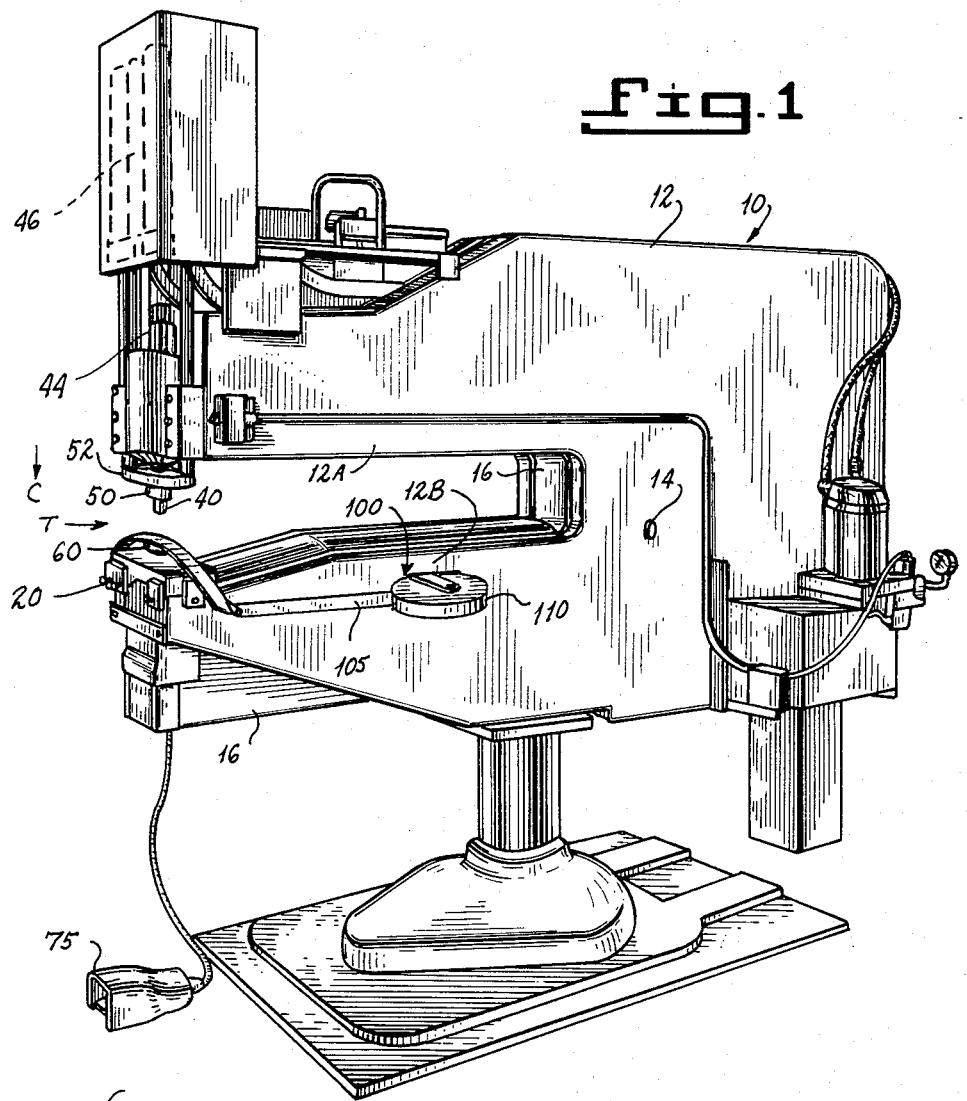
FIG. 1 is a general side perspective view of the ultrasonic welding apparatus used in accordance with the teachings of the subject invention.

An ultrasonic spot welding machine capable of welding together structural metal sheets, referred to generally by reference numeral 10, is illustrated in side perspective view in FIG. 1. Ultrasonic spot welder 10 includes a generally C-shaped clamping frame 12 pivotably mounted about pivot 14 and supported on a stationary central welder frame 16. Clamping frame 12 includes elongated upper and lower sections 12A and 12B, respectively, which, in combination with the central welder frame 16, define a throat T into which the workpieces to be welded may be inserted for welding.

A welding head 20, including a welding tip 21, which forms the end of a vibratory reed 22, is provided and is secured to stationary welder frame 16. A slideably mounted anvil 40 is provided on the opposite side of the throat. Collar clamps 50 and 60 are provided about the anvil 40 and the welding tip 21, respectively. Anvil 40, which is movable toward and away from welding tip 21 along anvil tracks 44, is powered by at least one internally contained, hydraulic anvil cylinder 46. Movement of anvil 40 is independent of movement of collar clamp 50. When a workpiece W to be welded (not shown in FIG. 1) is inserted into the throat T between the anvil 40 and the welding tip 21, the anvil 40 and the clamp 50 are lowered in a clamping direction C toward welding tip 21 until the workpieces are clamped together between collar clamps 50 and 60 and between the welding tip 21 and the anvil 40. This clamping action between clamps 50 and 60 as well as between the welding tip 21 and the anvil 40 serves not only to clamp the workpieces together but, additionally, causes a compressive force to be applied between them. Foot switch 75 is provided to operate the welding apparatus.

Tape transport means 100 is further provided for providing a sacrificial material between the welding tip 21 and the workpieces W in order to prevent sticking between the welding tip 21 and the workpieces W. It has been found that if such a sacrificial material is placed between the welding tip 21 and the workpieces W and, further, if such material has a hardness greater than the hardness of the welding tip 21, a tip sticking problem heretofore experienced using prototypes welding equipment is substantially reduced and, oftentimes, totally eliminated. Tip sticking has been a constant problem in ultrasonic welding and causes a sloughing off of the material of the workpiece onto the welding tip 21 thereby necessitating frequent cleaning with attendant machine shutdown resulting. In operation, welds are created between the workpieces W as well as between the material and the workpieces. Since, however, the sacrificial material is a high hardness material, the strength of the bond between the material and the workpieces is poor and is easily stripped away. In contrast, however, the weld effected between the workpieces is good and remains strong after stripping away of the sacrificial material.

As shown in FIG. 1, sacrificial material 105, which may be, for example, stainless steel or other like material, is stored on a feed roll 110 provided on one side of the welding apparatus 10. Sacrificial material 105 is drawn from feed roll 110 across the welding tip 21 between the tip 21 and the workpieces and is taken up by a powered take-up roll (not shown). In a manner which will be explained in greater detail, sacrificial material 105 is adapted to be indexed and progressively drawn across the tip 21 after each weld is effected so that fresh material is always provided between the welding tip 21 and the workpiece. Spot welding of the workpieces may therefore be accomplished in the manner hereinafter described.

Vibratory reed 22, at a point distant from the welding tip 21, is connected to a transducer (not shown) which is contained within welding frame 16. The transducer transmits lateral vibrations and induces flexural vibration of the reed 22 so that the welding tip 21 at the upper end of the reed 22 may introduce shear vibrations into the workpieces. The transducer consists of piezoelectric ceramic elements encased in a tension shell assembly and is operated at a nominal frequency of about 15 kHz.

Spot welder 10, which is a modification of the Sonobond Model M-8000 ultrasonic spot welder, includes a frequency converter which incorporates a wide-band RF power measuring circuit for sampling the output power to detect the forward power and the load power based on the principle of bi-directional coupling in a transmission line. The signal is processed electronically by internal circuitry to provide true RMS values which are displayed as either the forward power or the load power. Forward power is the output of the frequency converter delivered to the transducer in the welding tip 21 while load power is the transducer drive power that is acoustically absorbed in the weld zone. The difference between the forward power and the load power represents the reflected power induced by the load impedance mismatch and is minimized during subsequent welding operations by impedance matching techniques.

Welding tip 21 and anvil 40 are both fabricated from a generally hard metal such as, for example, steel hardened to about Rc 50. The radii of the welding tip 21 may be between about 2" and about 20" and the shape and dimension of anvil 40 generally conforms to that of the welding tip 21.

Ultrasonic welding using spot welder 10 is accomplished by initiating a relatively small spot weld in the workpieces and then radially expanding the weld outwardly from the small initial point to full size in a controlled fashion. To this effect, the growth of the spot weld is effected by initially creating the relatively small point weld and then synchronously and in a controlled manner ramping the welding pressure and power to cause gradual but progressive weld growth. This contrasts with such prior art techniques as, for example, the Robinson patent, wherein as the pressure naturally rises upon contact, the welding power is abruptly turned on.

According to this method, the workpieces to be welded together are clamped between the welding tip 21 and anvil 40 by collar clamps 50 and 60. The welding cycle is commenced by causing anvil 40 to begin a controlled rate of forging pressure against the workpieces. Anvil 40 exerts this forging pressure against the workpieces by introducing a controlled flow into anvil hydraulic cylinders 46. It will, of course, also be appreciated that forging pressure may also be effected by causing welding tip 21 to be driven against the workpieces. Ultrasonic energy from vibratory reed 22 is simultaneously delivered through welding tip 21 into the workpieces. Using pre-programmed electronic processors, the ultrasonic power level is increased as the forging pressure increases. When the programmed cycles of power and pressure have been completed a preset timing device opens and causes the welding power to shut off and the forging pressure to be released.

The workpieces may be first "presqueezed" together at relatively low pressure, i.e., between about 100 and about 3000 psi and preferably between about 400 and 500 psi when using a sealant between the workpieces and about 1700 psi when using a film adhesive, all based upon a 1.5" diameter cylinder. Typically the workpieces are presqueezed for up to about 10 seconds and, preferably, up to about one second. Presqueezing the workpieces tends to cause the sealant or adhesive to fully spread out and helps to create metal-to-metal contact between the workpieces.

Figure 2:
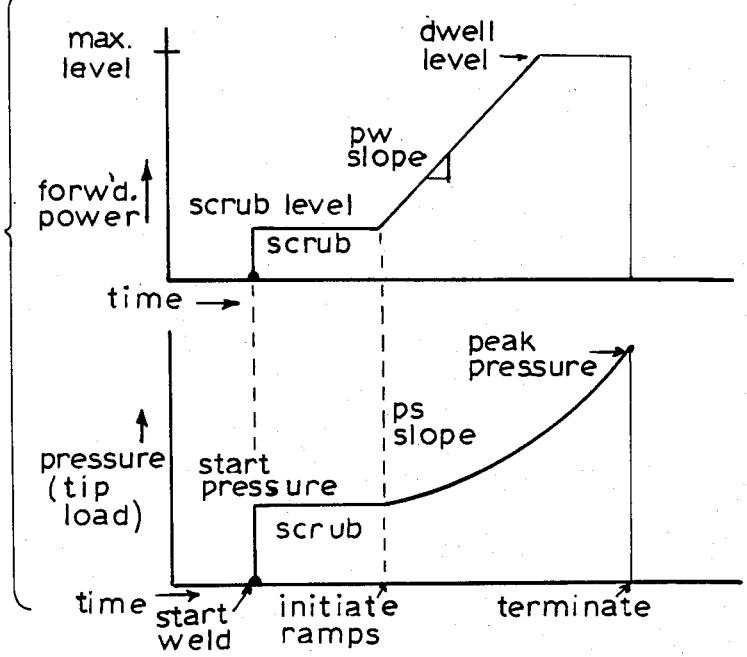
FIG. 2 is a composite graph illustrating ramping of forward ultrasonic welding power and pressure (tip load) as a function of time during the welding cycle.

A graph of the relationship of the welding power and forging pressure as a function of time during the weld cycle is illustrated in FIG. 2.

As shown in FIG. 2, after the "presqueeze" step, a "scrubbing" step may be effected. Scrubbing is used to precondition the surfaces of the workpieces due to the wide variations which may occur in surface conditions due to the oxide layers which occur. It has been found that by applying relatively lower power and pressure in such a preliminary step, the surface oxide layers can be "scrubbed" off. This permits more uniform welding since actual welding is then performed on workpieces having generally uniform surface conditions. It thus results in reasonably repeatable starting surface conditions before the weld spot is actually formed. The scrub period is particularly useful in situations where organic interlayers are used in that it assures that metal-to-metal contact has been made through the organic interlayer which tends to flow upon the application of power and pressure. The scrubbing step is generally performed under forging pressures in a hydraulic cylinder of 1.5" dimater of between about 50 and about 1000 psi and, preferably, between about 50 and 200 psi. Welding power in the scrubbing step is normally set at between about 400 and about 1500 watts and, preferably, between about 400 and about 1000 watts. Scrubbing time is normally between about 0 and about 10 seconds and, preferably, is about 0.01 seconds. Both welding power and forging pressure are simultaneously applied to the workpieces.

After the scrubbing step, forging pressure and welding power are then simultaneously ramped at a progressive controlled rate and to maximum levels depending upon the materials being welded together and their thickness. In this manner, the individual spot weld is permitted to progressively expand and grow from a small point to its ultimate size. Initial power and pressure levels should always be insufficient to decouple the tip but should be sufficient to apply shear forces at the edges of any prevailing contact area. As the forging press and welding power are increased, the size of the welded area grows and the peripheral shearing should continue. Further increases in the pressure and power increase the shearing area until the final weld area is achieved with its resultant high strenth. While the rates of the increase for the pressure and the power may differ, the significant feature is that the ramping of the welding power and forging pressure begin simultaneously. Forging pressure using a 1.5" diameter cylinder may range between about 50 and about 10,000 psi. When welding aluminim workpieces, forging pressure typically ranges between about 180 and about 2000 psi; when welding copper to steel, forging pressure may exceed about 10,000 psi; and when welding titanium, forging pressure is preferably about 4000 psi. Similarly, welding power may range between about 400 and about 4000 watts. Maximum welding power level should always be reached.

As shown in FIG. 2, after the scrub period, the welding power is ramped through a ramp period and then reaches a maximum dwell level where it is maintained through a dwell period which comprises the balance of the weld cycle. In contrast, after the scrub period, the forging pressure is normally continuously ramped through the entire weld cycle, reaching the maximum leval at the conclusion of the weld cycle. Forging pressure, therefore, normally never reaches a dwell period but, instead, is permitted to continuously increase during the entire weld cycle. The entire weld ramp period typically takes at least 0.1 seconds and preferably lasts between about 1 and about 2 seconds.

As will be appreciated, the ramping rates both as to rate of increase and maximum levels is highly dependent upon the types of material being ultrasonically welded together and the thicknesses thereof. Additionally, while FIG. 2 depicts the rate of increase in linear terms, these are not the only types of curves which could be used relative to rising pressure and power levels. Nonlinear curves of power and pressure as a function of time may commonly be applied and may be desirable in particular welding situations.

Tests conducted comparing welds created using progressive growth procedures versus conventional procedures demonstrate the advantage of the former. The average shear strength of sheets of 0.063" 7075-T6 aluminum welded using progressive growth techniques was 15,600 compared to 11,800 for similar sheets welded using straight power methods. It will be appreciated that individual spots may be higher or lower than this average figure.

FIGS. 3-5 illustrate the weld zone of the welding apparatus 10 of the present invention during the sequential welding operation of the present invention. As shown in FIG. 3, the workpieces W1 and W2 as well as sacrifical material 105 is provided between the welding tip 21 and the anvil 40 and between the collar clamps 50 and 60 provided about the anvil 40 and the welding tip 21. As shown in FIG. 4, in the next sequence of the welding operation, the anvil 40 and the collar clamp 50 provided about the anvil 40 are brought down in clamping direction C thereby tightly clamping the workpieces W1 and W2 in position and thereupon effecting a weld between the workpieces as well as between one of the workpieces and the sacrificial material 105. In the next sequence, clamp 50 and anvil 40 are raised from the clamping and welding position and the workpieces are moved in one direction while the sacrificial material is indexed in an opposite direction thereby breaking whatever weld may have otherwise occured between the workpieces W and the sacrificial material 105.

Figure 6:
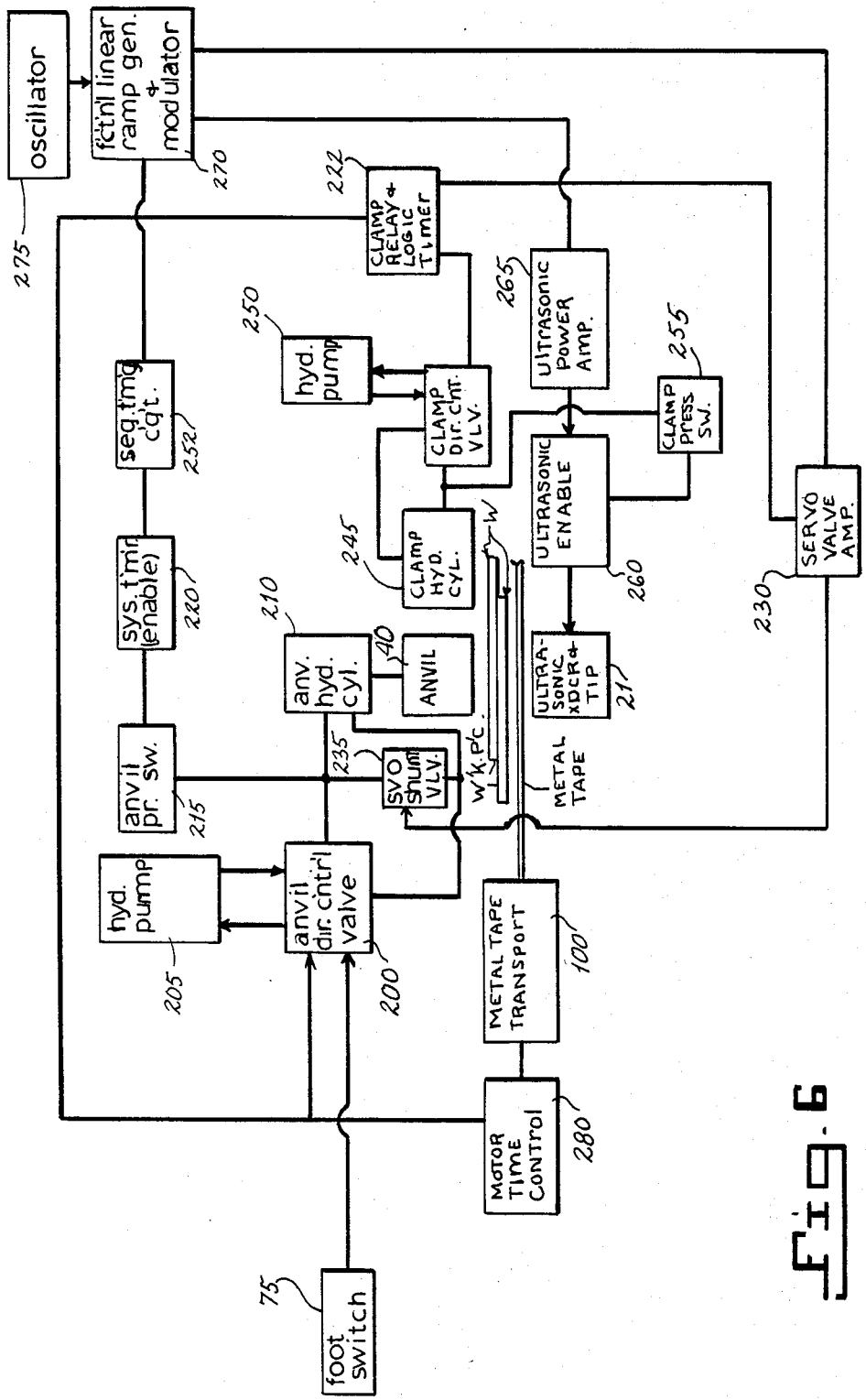
FIG. 6 is a block diagram illustrating the steps during the sequential welding operation of the present invention.

FIG. 6 illustrates, in block diagram format, the automatic sequencing of the ultrasonic welding system of the present invention. Any variety of electronic, hydraulic and/or other devices may reasonably be used to accomplish the automatic sequencing described herein. The primary objective of the system is to provide an integrated sequence of functions on the welding apparatus 10 all of which are initiated by a singe switch which, therefore, serves to reduce operator burden and fatigue. These functions have all been arranged to occur within a timed weld interval which is shown for illustrative purposes in the block diagram of FIG. 6.

The weld cycle is initiated with the use of a foot switch 75 which energizes and causes 115VAC to be applied to a solenoid A contained within an anvil directional control valve 200 which permits flow of hydraulic fluid to anvil hydraulic cylinder 210. Hydraulic pump 205 is provided relative to anvil directional control valve 200 in order to pump the hydraulic fluid into hydraulic cylinder 210Flow of hydraulic fluid to hydraulic cylinder 210 causes anvil 40 to move in clamping direction C and interface with the workpieces W and the welding tip 21 on the opposite side of the workpieces W. Sacrificial metal tape 105 is provided between the workpieces W and the welding tip 21 and movement of the tape 105 will be discussed in greater depth, infra. Upon contact of the anvil 40 against the workpieces W, the hydraulic fluid flow is deadheaded causing a pressure buildup in anvil hydraulic clyinder 210. Upon reaching a predetermined pressure, an anvil press switch 215 closes which initiates a system enable timer 220 by latching 115VAC on solenoid A in anvil hydraulic cylinder 210 and keeps pressure against the workpieces W and the welding tip 21. Simultaneously, latched voltage is inputted to a clamp relay logic timer assembly 222. A timed step function signal is then sent to a servo valve amplifier 230 which closes a servo shunt valve 235. When servo shunt valve 235 is closed, anvil pressure rises sharply to a high pressure limit established for the hydraulic system. This results in a short high pressure squeeze on the workpieces W effected by the anvil 40.

A second output from the clamp relay logic and timer assembly 222 goes to solenoid A of a clamp directional control valve 240 which then activates clamp hydraulic cylinder 245 and forces a clamp (not shown) down to interface with and against the workpieces W. Hydraulic pump 250 is provided to power the clamp directional control valve 240.

The system enabler timer 220 also serves to trigger sequential timing circuits 252. Adjustable electronics may be provided to delay the application of ultrasonic welding power and pressure waveforms until the anvil high pressure squeeze, the return to low anvil pressure and the clamp has been compressed against the workpieces W. The deadheading of the clamp against the workpieces W serves to close a clamp press switch 255 which, in turn, activates an ultrasonic enable 260 whch enables ultrasonic power to be applied to the workpieces W. In phase with the application of the linear modulated ultrasonic frequency waveforms to an ultrasonic power amplifier 265 is the linear input signal to the servo valve amplifier 230. Both the linear modulated ultrasonic waveform and the input to the servo valve amplifier 230 are generated in a functional linear ramp generator and modulator assembly 270. The slope and amplitude of the applied waveform are both adjustable. An oscillator 275 provides a steady state frequency input to the functional linear ramp generator and modulator assembly 270. With the ultrasonic power enabled, ramped welding power is applied to the servo valve amplifier 230 which controls the current to the servo shunt vavle 235.

As ultrasonic power is increased, anvil pressure is synchronously increased. When the system enable timer 220 times out, the weld cycle is completed and the latching voltage is removed. A timed 115 VAC input is provided to solenoid B of both the anvil and clamp directional control valves 220 and 240, respectively, in order to reverse the hydraulic flow and raise the anvil 40 and clamp 50 (see FIG. 1).

Concurrently, a motor time control 280 is energized which permits a metal tape transport system 100 to incrementally index sacrificial metal tape 105 to the next unused position.

All of the above steps described in FIG. 6 are completed in three seconds or less and the system is then immediately ready to repeat another weld cycle. It will, of course, be appreciated that the above system results in a welding system which permits a wider scope of weld schedules for a variety of different workpieces which may include different materials, varying material thicknesses, different finishes as well as the ability to weld through adhesives and sealants. In comparison, existing welding apparatus have limited performances and are mostly restricted to manual control.

Having thus described the invention with specific reference to the preferred embodiments thereof, it will be appreciated that the invention may be practiced with certain modifications which do not depart from the spirit and scope thereof and, accordingly, protection should be defined by the scope of the claims appended hereto.

Wherefore, I claim:

1. A method of welding workpieces using ultrasonic vibratory spot welding apparatus of the type having welding elements including a welding tip and a complimentary anvil both mounted on a welding frame and between which the workpieces are adapted to be inserted for welding, said welding apparatus further including clamping means for clamping together the workpieces to be welded and maintaining alignment thereof during the welding operation, said method comprising the steps of:

introducing said workpieces between said anvil and said welding tip and clamping said workpieces in a welding position;

causing one of said welding elements to move to the other of said elements to exert a first predetermined amount of pressure against the workpieces;

introducing a first predetermined amount of high frequency ultrasonic energy into said workpieces from said welding tip;

simultaneously increasing the amounts of pressure and energy to second predetermined amounts, said second predetermined amounts being sufficient to effect a weld between said workpieces;

releasing the pressure and terminating the ultrasonic energy introduced into the workpieces; and removing the workpieces from between the welding elements.

2. The method of claim 1 wherein said clamping means comprises collar clamps provided about said anvil and said welding tip and wherein said workpieces are clamped in position by causing said collar clamps to be drawn together in a clamping direction.

3. The method of claim 1 wherein said anvil is adapted to move toward said welding tip to generate pressure against the workpieces.

4. The method of claim 1 wherein said first predetermined amounts of pressure and energy are amounts sufficient to remove oxide layers from the workpieces.

5. The method of claim 1 wherein the resultant spot weld is initiated as a small spot and then progressively expanded to full size.

6. The method of claim 1 further including the step of applying initial pressure against the workpieces prior to introducing any ultrasonic energy into the workpieces in order to disperse adhesive material between said workpieces.

7. The method of claim 6 wherein said initial pressure is an amount between about 100 and about 3000 psi.

8. The method of claim 1 wherein said first predetermined pressure is between about 50 and about 1000 psi.

9. The method of claim 1 wherein said first predetermined energy level is between about 400 and about 1500 watts.

10. The method of claim 1 wherein said second predetermined amount of pressure is between about 50 and about 10,000 psi.

11. The method of claim 1 wherein said second predetermined amount of energy is between about 400 and about 4000 watts.

12. The method of claim 1 wherein synchronization of the steps are automatically controlled and coordinated.

13. A method of welding workpieces using ultrasonic vibratory spot welding apparatus of the type having welding elements including a welding tip and a complimentary anvil both mounted on a welding frame and between which the workpieces to be welded are adapted to be inserted for welding and clamping means for clamping together the workpieces to be welded prior to effecting the welding operation and maintaining alignment during said operation, said method comprising an automated and synchronous method for effecting the following steps of a timed weld interval:

causing one of the welding elements to move in a clamping direction toward the other element and engage the workpieces;

generating a timed high pressure pulse between the welding elements;

reducing the pressure between the welding elements;

clamping the workpieces;

introducing high frequency ultrasonic energy into said workpieces at a predetermined level;

simultaneously increasing pressure and energy levels to maximum amounts;

releasing the clamping pressure and anvil pressure; and removing said workpieces.

14. The method of claim 13 further including the step of introducing a metallic tape between the welding tip and the workpieces and, upon completion of each weld cycle, causing said tape to index a predetermined distance over the welding tip.

15. The method of claim 13 wherein said timed weld interval is initiated by activation using a foot switch.

16. The method of claim 13 wherein said pressure and energy are increased to maximum amounts in phase.

17. Ultrasonic welding system of the type having a welding tip and a complimentary anvil between which workpieces to be welded are adapted to be introduced for welding by introducing high frequency ultrasonic energy into said workpieces to effect a weld therebetween and further including clamping means adapted to clamp said workpieces together prior to welding and maintain alignment of said workpieces during the welding interval, said system including synchronous control means for effecting operation of said system during a timed weld interval, said control means comprising a functional linear ramp generator and modulator adapted to synchronously control the movement of said anvil and said clamping means and the amount of ultrasonic energy introduced into said workpieces.

18. The system of claim 17 wherein said anvil and said clamping means are hydraulically operated.

19. The system of claim 18 wherein a metal tape transport system is further provided for positioning a metal tape between the welding tip and the workpieces and wherein said control means if further adapted to control the movement of said tape after each weld is effected.

* * * * *